(12) United States Patent
Hernandez et al.

(10) Patent No.: US 9,243,915 B2
(45) Date of Patent: Jan. 26, 2016

(54) DEVICES AND METHODS FOR PASSIVE NAVIGATION

(71) Applicant: Physical Devices, LLC, Durham, NC (US)

(72) Inventors: Walter C. Hernandez, Potomac, MD (US); Frederick Vosburgh, Durham, NC (US)

(73) Assignee: Physical Devices, LLC, Durham, NC (US)

( * ) Notice: Subject to any disclaimer, the term of this patent is extended or adjusted under 35 U.S.C. 154(b) by 0 days.

(21) Appl. No.: 14/515,761

(22) Filed: Oct. 16, 2014

(65) Prior Publication Data

US 2015/0106008 A1  Apr. 16, 2015

Related U.S. Application Data

(60) Provisional application No. 61/891,878, filed on Oct. 16, 2013.

(51) Int. Cl.
*G01C 21/16* (2006.01)
(52) U.S. Cl.
CPC ....................................... *G01C 21/16* (2013.01)
(58) Field of Classification Search
CPC ......... G01C 21/16; G01P 15/00; G01P 15/18; G01P 3/48; G01P 3/481; B64G 1/409
See application file for complete search history.

(56) References Cited

U.S. PATENT DOCUMENTS

| | | | |
|---|---|---|---|
| 1,948,384 A | 2/1934 | Lawrence | |
| 5,179,762 A * | 1/1993 | Wisnasky | A47L 5/38 15/314 |
| 5,686,669 A | 11/1997 | Hernandez et al. | |
| 6,352,219 B1 * | 3/2002 | Zelic | B64C 39/005 244/12.1 |
| 2008/0255795 A1* | 10/2008 | Shkolnikov | G01C 21/165 702/141 |
| 2009/0045061 A1* | 2/2009 | Farrow | B82Y 10/00 204/471 |
| 2010/0251691 A1* | 10/2010 | Mills | F03H 99/00 60/202 |
| 2012/0086725 A1* | 4/2012 | Joseph | G06F 3/038 345/629 |

OTHER PUBLICATIONS

"Proposed Claim Amendments for Allowance"; authored by: Greg Hunt; recieved Sep. 4, 2015.*
Deacon et al., "Cyclotron Resonance study of the electron and hole velocity in graphene monolayers," Phys. Rev. B 76 081406(R), http://arxiv.org/abs/0704.0410, pp. 1-5 (Jul. 11, 2007).

(Continued)

*Primary Examiner* — James Trammell
*Assistant Examiner* — James E Stroud
(74) *Attorney, Agent, or Firm* — Jenkins, Wilson, Taylor & Hunt, P.A.

(57) ABSTRACT

Devices and methods are disclosed for determining position and controlling navigation by sensing movement through the Earth's magnetic field. Change in position is determined by integrating velocity which has been normalized for spatial and temporal field variation. Position is registered with respect to starting point and/or subsequently detected environmental feature. Signals are provided to actuator for guidance, navigation and control.

23 Claims, 3 Drawing Sheets

(56) References Cited

OTHER PUBLICATIONS

Fréchette et al, "High-Speed Microfabricated Silicon Turbomachinery and Fluid Film Bearings," Journal of Microelectromechanical Systems, vol. 14, No. 1, pp. 141-152 (Feb. 2005).

Gebre-Egziabher et al., "Design and Performance Analysis of a Low-Cost Aided Dead Reckoning Navigation System," Int. Conf. Integr. Nav. Sys., pp. 1-10 (2001).

* cited by examiner

DEVICES AND METHODS FOR PASSIVE NAVIGATION

PRIORITY CLAIM

This application claims the benefit of U.S. Provisional Patent Application Ser. No. 61/891,878, filed Oct. 16, 2013; the disclosure of which is incorporated herein by reference in its entirety.

TECHNICAL FIELD

The subject matter described herein relates to navigation and control. More specifically, it relates to determining and controlling position and trajectory with respect to the Earth's magnetic field.

BACKGROUND

The Global Positioning System (GPS) and similar satellite navigation systems (collectively, position, velocity, and time (PVT)) orbiting thousands of miles above the Earth have made possible determination of position and velocity by processing precise timing signals, to the benefit of consumer, commercial and government users alike. PVT signals are, however, quite weak when they reach the ground, making them easily disrupted by inadvertent or intentional interference as well as making them of little use in buildings.

Loss of PVT reception can cause navigation errors that increase operating costs and risk of accidents. As a result, various alternative and supplementary means have been proposed to improve the reliability and safety of instrument guided navigation. Active sensors, such as terrain following radar, do not require PVT or other radio frequency (RF) reference signals but impose cost and power burdens that severely limit their use. In response to such burdens, considerable time and money have been spent in efforts to create low cost and reliable passive instrument guided navigation technology.

Other than PVT, existing passive navigation relies primarily on image recognition, other RF signals and inferential sensors. Image recognition depends on visibility of previously mapped topography, limiting the conditions and areas where it can be used. RF reference signals where they exist are, like PVT, subject to interference and spoofing, reducing their value for instrument guided navigation. Waypoint navigation using magnetic field maps has been proposed but the cost of generating and continually updating such maps to compensate for field changes is prohibitive.

The most commonly used inferential sensor is the inertial measurement unit (IMU) which estimates position by double integration of trajectory disturbance signals. Unfortunately, such processing creates fast growing, unbounded errors. And, IMU are insensitive to constant forces, e.g. cross winds, which can create large cross track errors.

In light of the above, we disclose passive magnetic sensing means of determining position and velocity (PV) without requiring precise timing signals or maps.

Objects

A first object of the subject matter described herein is determining position of a platform, such as an airplane, submarine, or automobile. A second object is determining velocity through a magnetic field. A third object is determining a magnetic field signal. A fourth object is normalizing velocity for variation in magnetic field. A fifth object is registering position with respect to known location. A sixth object is platform navigating. A seventh object is forming magnetic field map.

SUMMARY

A method for controlling navigation of a platform includes providing a sensing element for producing a tangential velocity of a charge during translational movement of the platform. The method further includes detecting compound velocity signals induced in the sensing element from a combination of the tangential velocity and a translational velocity of the charge caused by the translational movement of the platform. The method further includes processing the detected signals to determine a velocity signal. The method further includes integrating the velocity signal to determine a change in position signal. The method further includes registering the change in position to an initial position or to a detected environmental feature of known location for determining a navigation signal.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

We disclose devices and methods for determining position and velocity with respect to the Earth's magnetic field (hereinafter "field").

Position and velocity as well as strength of the Earth's magnetic field can be determined in 1, 2 or 3 dimensions. Velocity typically is normalized for variation in field strength.

Change in position is determined by integrating velocity over time. Current position is determined by registering a change in position with respect to an initial position. Position registration can be updated from time to time with respect to detected environmental features of known locations. Navigation is intended to encompass guidance and control of platform trajectory; trajectory encompasses at least one of: position, velocity, attitude and disturbance.

The subject matter described herein detects a transit velocity signal induced by processing a compound velocity signal which is proportional to the product of translational velocity and the projection of sensing element tangential velocity in the direction of platform transit. Tangential velocity is intended to cover angular motion of a spinning disk type sensing element, circulation of charged particles such as electrons in a circulation type sensing element and linear motion of particles in a non-circular detector. A sensing point is defined as the detecting part of a sensor. Disturbance force, defined as force that can disturb transit, is quantified by forming a difference signal from variation in certain velocity signal components, e.g. modulations of encoder signals, among other signal components.

Normalizing the velocity signal for variation in field strength is conducted by forming quotient of one or more frequency components of the velocity signal with one or more frequency components of a field signal. One illustrative such quotient can be obtained by dividing a DC component of velocity signal by DC component of the field signal. Another illustrative quotient can be obtained by dividing a plurality of velocity signal components, e.g. between 0 Hz and Nyquist frequency, by a resampled field signal comprising a plurality of frequency components, e.g. between 0 and 20 Hz or 1 and 5 Hz among other pluralities.

Figure 1:
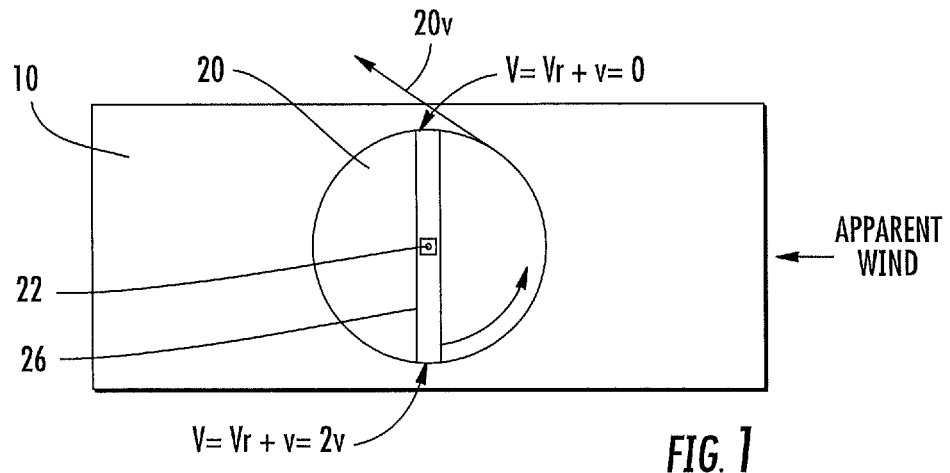
FIG. 1 is a diagram of a platform moving translationally with a spinning disk mounted on the platform.

Referring to FIG. 1, modification of a principle on inertial frames of reference illustrates how velocity can be measured with respect to the Earth's magnetic field without prior knowledge of the field and without RF reference signals, such as PVT. This principle involves a boy riding on a moving train 10 while juggling a ball, which he sees move straight up and down while an observer on the ground sees it trace arcs determined also by movement of the train 10. Imagine that the boy tosses the ball into an apparent wind induced by train transit, which will force the ball rearward regardless of where the boy is standing or direction he is facing. Now, imagine that the boy is standing on a turntable 20 spinning about an axis 22 with a tangential velocity (vr) 20v with a magnitude equal to the train's transit speed (v). In this case, when the boy is facing and rotating forward his velocity due to turntable spinning is v and the ball encounters an apparent wind velocity of 2v. After the turntable rotates 180 degrees, the boy is facing and turning directly backwards with a velocity due to turntable spinning equal to −v, which is opposite the velocity of the train, so the ball encounters no apparent wind. The difference in apparent wind, i.e. 2v−0, is a measure of how fast the train is moving.

If we remove the boy and assume the turntable 20 is made of conductive material that is exposed to an apparent "magnetic wind", charge will be induced in the turntable that varies around the turntable 20, as illustrated by the difference in charge between ends of a diametric element 26, with charge at the forward moving end written as:

$$q(t)=\epsilon B(r\omega+v\cos\omega t) \quad (1)$$

where q=charge, $\epsilon$=permittivity, B=magnetic field strength, r$\omega$=rotational velocity, and v=transit velocity. Charge at the opposite end, which reduces to $\epsilon B(r\omega)$, is set aside here as not affecting the difference.

Taking the derivative of Eq. 1, we obtain an expression for current, j(t):

$$j(t)=\epsilon B(0+v\omega\sin\omega t) \quad (2)$$

Multiplying by the element's end-end resistance (2R/$\sigma$) yields an expression for end-end potential:

$$E=\epsilon Bv\omega\sin(\omega t)*(2R/\sigma) \quad (3)$$

Substituting and rearranging this gives:

$$E=2(\epsilon/\sigma)B(R\omega)v \quad (4)$$

Assuming R$\omega$ is constant and normalizing for variations in field strength, this becomes:

$$E/B=Kv \quad (5)$$

where k is a lumped constant proportional to $2*(\epsilon/\sigma)*(R\omega))$, yielding an expression for transit velocity v, where v=E/KB.

The above derivation is for transit orthogonal to the magnetic field lines, where signal dynamic range and, therefore, sensitivity, is greatest, with magnitude falling as the direction of transit approaches that of the field lines. As a result, the turntable 20 preferably has a maximum tangential velocity 20v as means of providing adequate sensitivity over a wide range of directions. In some cases, tangential velocity 20v is set as high as sustainable during a period of navigation, measurement, or operational lifetime.

Field strength, B, Is not readily measured between the ends of the diametric element 22. It can, however, be measured from a sensing element 120 having a finite tangential velocity 120v by positioning a sensing point proximate the disk axis 22 and at any non-axial proximate point, e.g. on the periphery, of the turntable 20, to support measurements as done with a Faraday disk. An alternative is using a magnetometer or a memory that can contain field data.

Figure 2:
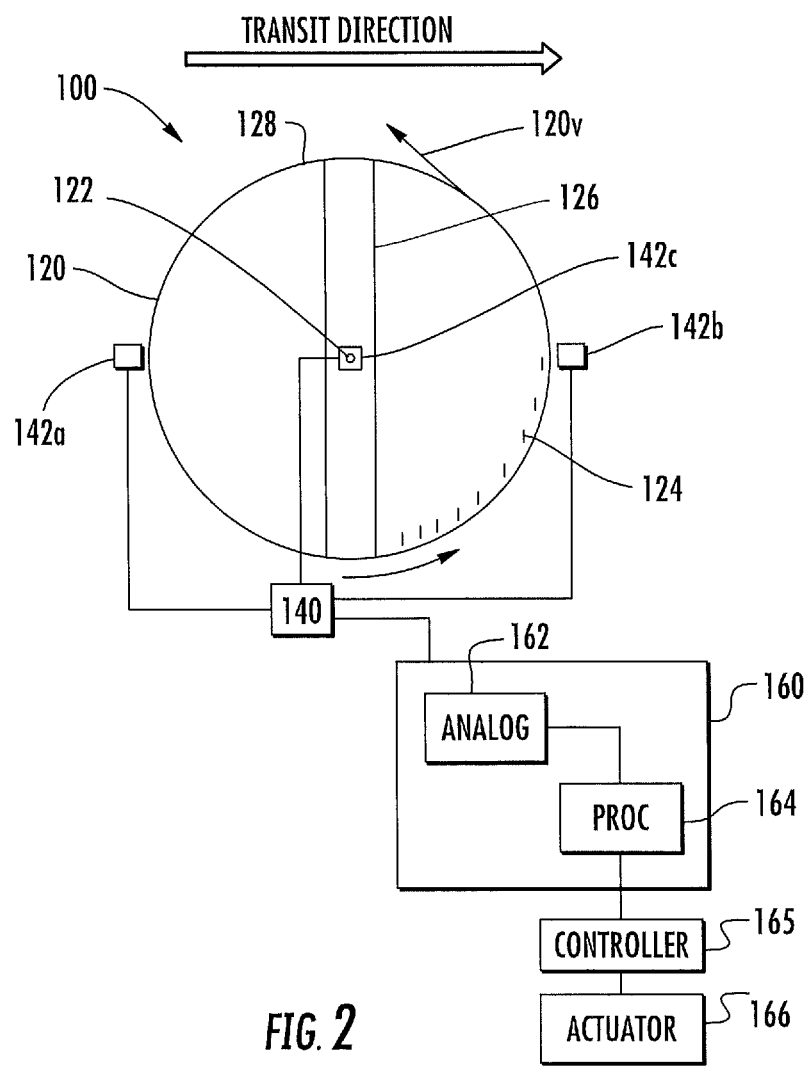
FIG. 2 is a diagram of a spinning disk device according to an embodiment of the subject matter described herein.

Referring to FIG. 2, an illustrative spinning disk type device 100 according to an embodiment of the subject matter described herein comprises at least one spinning disk type sensing element 120 that can be spun with a tangential velocity 120v greater than 1 m/s and that has at least one disk feature 124, such as a notch, protuberance, mark, or material domain, that can be detected by a sensor 140 and a diametric element 126 that spins with sensing element 120 and holds charges at its diametrically opposite ends. Although not illustrated here, device 100 can comprise two or more sensing elements 120 mounted at least partly orthogonal to each other.

Sensor 140 comprises at least two sensing points 142a, 142b of any type that can detect disk feature 124. Sensing points 142a, 142b are positioned proximate sensing element periphery 128 on a line passing through the center of the disk and parallel to a direction of platform transit, although this arrangement is not required. Sensor 140 comprises a sensing point 142c positioned proximate rotational axis 122 of disk sensing element 120. Sensor 140 is connected to a processor module 160 of any type that can process sensor signals to provide an output of at least one navigation signal type of: velocity, field, normalized velocity, and control. Processor module 160 may be at least partially implemented in hardware.

Spinning disk type sensing element 120 is formed of a material having a charge relaxation time much longer than that of copper. A desirable charge relaxation time is any time between 1 microsecond and 1 second. An illustrative slow relaxation material is a semiconductor, such as Gallium Arsenide (GaAs). An illustrative spinning disk sensing element 120 comprises a 10 cm diameter GaAs wafer. Sensing element 120 comprises at least one detectable feature 124, e.g., numbering between 1 and 1000, or 2 and 200 detectable features.

A spinning disk type sensing element 120 is any that provide tangential velocity 120v between 1 m/s and 1000 m/s, or 5 m/s and 500 m/s. One example is a GaAs wafer spinning with a tangential velocity of 38 m/s. Another example is a micro-electromechanical system (MEMS) rotor spinning with a tangential velocity of 200 m/s.

Sensing points 142a and 142b comprise any type that can detect at least one of: charge, current and electron velocity, electron momentum, sensing element radiation (collectively hereinafter, "signal") by any means. In one example, sensor 140 can be a contact sensor, such as a brush that detects contact with features 124. In an alternate example, sensor 140 can be a non-contact sensor, such as a capacitive, inductive, encoder, optical, or radiation sensor that detects features 124 through non-contact means.

Processor module 160 comprises at least one of: an analog section 162, and a processing section 164 that may implement or interface with a controller 165 that provides a navigation control signal to an actuator 166 that controls navigation. Analog section 162 comprises at least one RF circuit that can provide at least one of pre-amplifying, filtering and digitizing. Processing section 164 is any type that can process signals from analog section to determine and output at least one navigation signal type of: transit velocity, field strength, normalized velocity, trajectory disturbance, attitude, rotation rate and navigation control. Processor module 160 is any type that can control tangential velocity of sensing element 120. Actuator 166 may be any electromechanical device that controls the position, velocity, acceleration, attitude or other navigational aspect of a platform.

Figure 3:
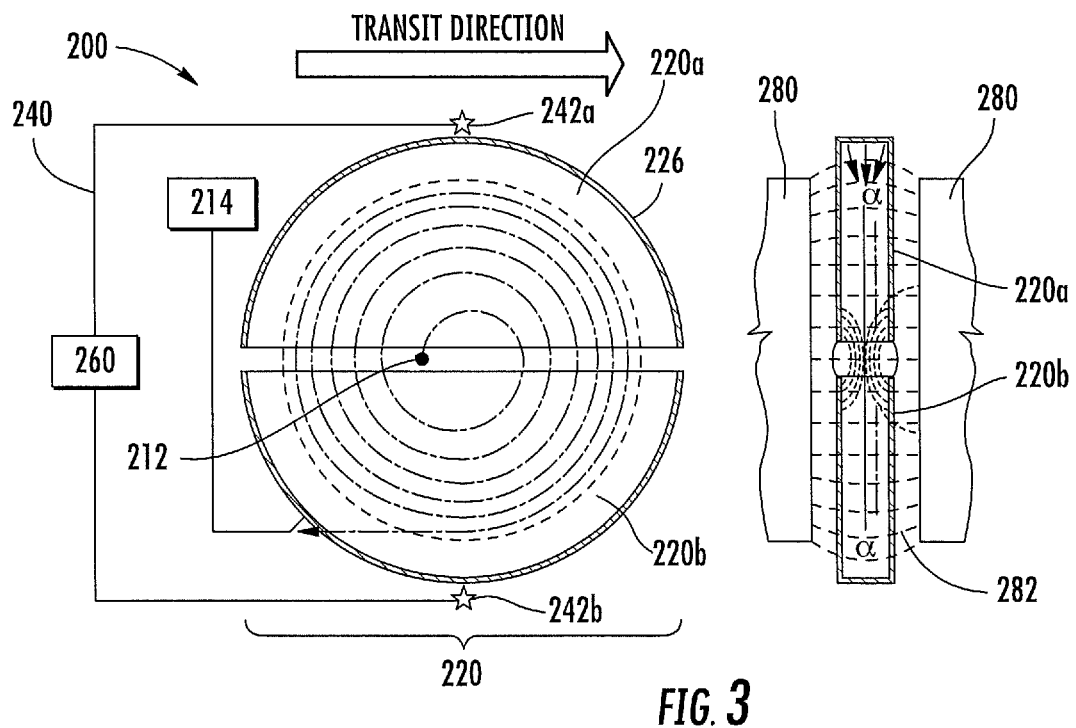
FIG. 3 is a diagram of a circulation device according to an embodiment of the subject matter described herein.

FIG. 3 illustrates another embodiment of a sensing element for determining a compound velocity signal from which a navigation control signal can be derived. In FIG. 3, the sensing element comprises a high tangential velocity circulation type device 200 based on the ion acceleration apparatus described in U.S. Pat. No. 1,948,384, the disclosure of which is incorporated herein by reference in its entirety. In FIG. 3, device 200 includes an electron source 212, an exciter 214, a circulation type sensing element 220 and magnets 280 providing a substantially uniform constraining magnetic field 282 with respect to electrons circulating in sensing element 220. Device 200 further comprises a sensor 240 with at least two sensing points 242a, 242b mounted proximate sensing element periphery 226.

Sensing element 220 comprises a circular geometry, although other geometries are acceptable. In some cases, sensing element 220 comprises a storage ring type providing circulation of electrons or linear tube type providing single pass circulation of electrons.

Although an electron source is illustrated in FIG. 3, any charged particle source may be used without departing from the scope of the subject matter described herein. Alternative charged particle sources that can be used include ion sources and proton sources.

Exciter 214 is disposed at a position where it can excite electrons circulation, e.g., within or proximate sensing element 220. For example, exciter 214 can comprise a pair of electrodes disposed between D-shaped cavity pair 220a, 220b. Another example is a linear exciter mounted in the path of circulating electrons, e.g. in a racetrack type sensing element, and another is an induction coil disposed parallel to plane of and externally proximate to sensing element 220.

Magnets 280 are characterized by at least one of the following properties: size, strength, shape and location suitable for deflecting electrons of desirable speed in a substantially circular of desirable radius. Magnet 280 is any that can provide a substantially uniform magnet field over spatial extent of sensing element 220.

A processing module 260 processes the signals output from sensing points 242a and 242b to produce a compound velocity signal that is based on both tangential and translational movement of charge. Processing module 260 may determine a navigation control signal based on the compound velocity signal and may provide the signal to a controller or directly to an actuator if the controller function is implemented within processing module 260.

Sensing points 242a, 242b are each of any type and positioning to detect at least one of the following aspects of electrons within constraining field 282: velocity, kinetic energy, energy, and deflection. An example positioning of sensing points 242a, 242b is proximate sensing element periphery 226 and on a line more or less orthogonal to direction of platform transit, although other arrangements are acceptable. Another example is sensing points 242a, 242b mounted proximate sensing element 220 on radii forming a more or less orthogonal angular separation.

Figure 4:
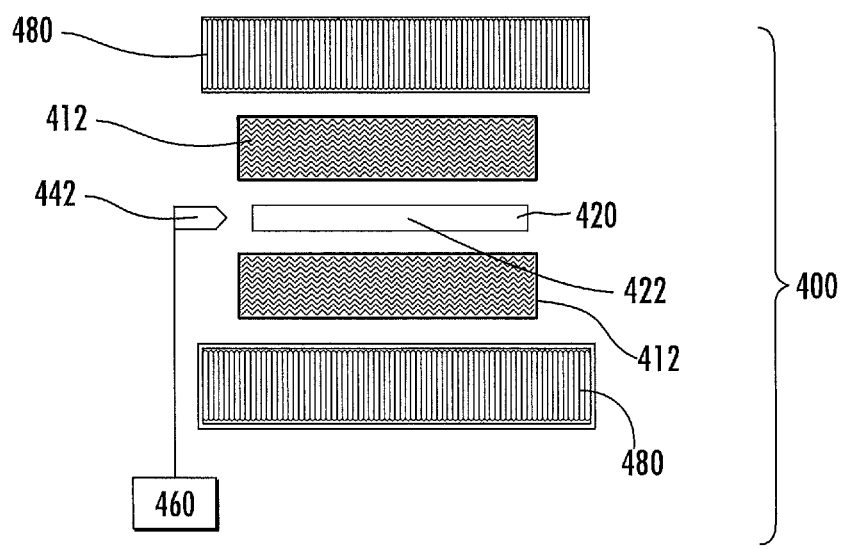
FIG. 4 is a diagram of a graphene device according to an embodiment of the subject matter described herein.

Referring to FIG. 4, in another embodiment of a sensing element 400, comprises a circulation type sensing element 420, in which charged particles such as electrons can be induced to travel in a circular motion, although circular is not required. In an illustrative embodiment, charged particles can be circulated in a racetrack devices such as used in physics research. An illustrative embodiment of sensing element 400 comprises a vacuum chamber in which electrons or other charged particles can be induced to circulate at tangential velocity greater than 10 m/s. Sensing element 400 comprising a materials type it further comprises an electron conducting layer 422, e.g. formed of a high mobility material such as graphene, indium antimonide (InSb), two-dimensional electron gas, or other material. Layer 422 can be suspended or mounted on a suitable substrate comprising portion of sensing element 420. Exciter 412 is any type that can impart energy to circulating electrons as means of providing desirable tangential velocity. Sensing point 442 is any type that can provide signals to a processor module 460. Magnets 480 provide a constraining field bending the electronics in an at least partly circular path.

Figure 5:
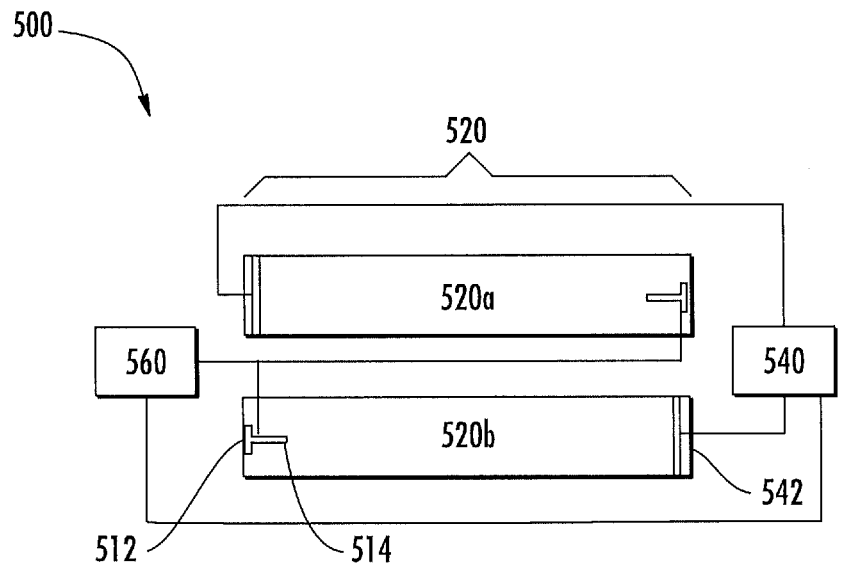
FIG. 5 is a diagram of a cathode ray tube (CRT) device according to an embodiment of the subject matter described herein.

Referring to FIG. 5, an alternative circulation type device 500 according to an embodiment of the subject matter described herein where device 500 comprises a sensing element 520, which includes a first chamber 520a and a second chamber 520b. In some cases, each chamber 520a, b is of evacuated tube type. Each illustrative evacuated tube type chamber 520a, 520b is a cathode ray tube (CRT) or electron storage ring. Sensing element 520 is preferably mounted parallel to transit direction of platform although this is not required. First chamber 520a is mounted anti-parallel to second chamber 520b. Chamber 520a, 520b each comprises an electron source 512, exciter 514 and sensing point 542. Sensing point is connected to sensor circuit 540 which is of any type that can provide at least one measurement of; particle velocity, momentum, and deflection. Circuit 540 is any type that can provide at least one of; combine and compare signals from sensing point 542 for chambers 520a and 520b. Electron source 512 is mounted at one end of tube 520a, 520b. Exciter 514 is mounted proximate source 512 is any type that can accelerate electrons and/or direct them towards sensing point 542. Device 500 includes a processor module 560 connected to at least one of; source 512, exciter 514 and sensing element 542. Device 500 comprises a comparator, for example, implemented by processor module 560, of any type that can compare at least one of arrival time, momentum or deflection of electrons at sensing point 542 of chamber 520*a*, 520*b*. Processor module 560 is any type that can synchronize emission and/or acceleration of electrons in chamber 520*a*, 520*b*. Processor is any type that can determine difference in at least one electron aspect of; time of arrival, velocity, energy, momentum, deflection and phase, between first tube 520*a* and second tube 520*b*. Another illustrative embodiment of comprises one or more sensing element 520 comprising an interferometer.

Figure 6:
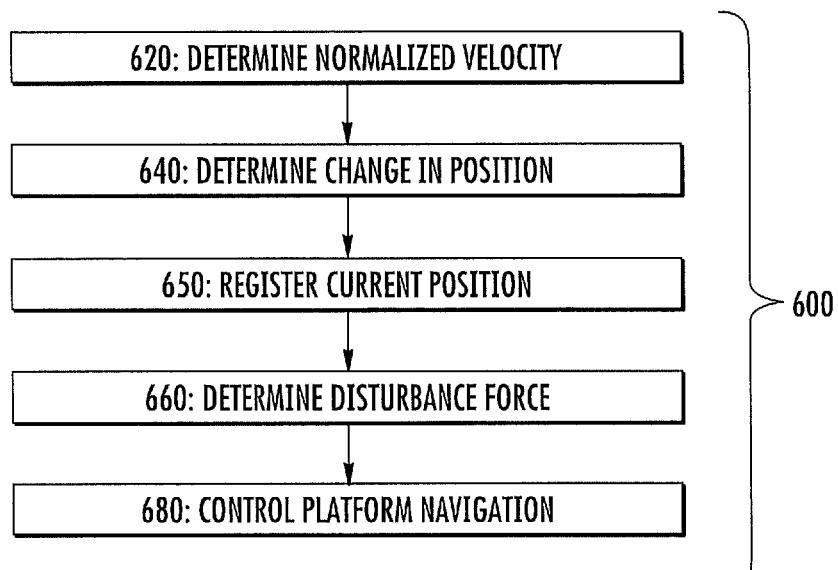
FIG. 6 is a flow chart illustrating an exemplary process for controlling platform navigation according to an embodiment of the subject matter described herein.

Referring to FIG. 6 an illustrative embodiment of the method 600 for platform navigation comprises: determining normalized velocity 620, determining change in position 640, registering current position 650, detecting disturbance forces 660, and controlling platform navigation 680.

Determining normalized velocity comprises forming the quotient of a velocity signal and magnetic field signal. Determining a velocity signal or determining field signal comprises low pass filtering to provide substantially DC frequency content. Determining the velocity signal comprises resampling using a resampling clock formed by band pass filtering a field signal to isolate primarily near-DC frequencies, e.g. 1 Hz to 10 Hz to provide velocity signal sampling at a fixed rate of 2^samples per rotation or circulation period of sensing element, which is known in the art to remove bin leakage and improve frequency resolution. In some cases, field signal is provided by a magnetometer.

Determining a velocity signal using a spinning disk sensing element comprises detecting charge separation and/or current (hereinafter signal) between a pair of peripheral sensor points. Determining a B-field (hereinafter field) signal from a spinning disk is conducted using signals between a peripheral sensing point and an axial sensing point. Controlling tangential velocity comprises at least one of: providing a control signal to a motor turning a spinning disk sensing element and selecting a disk of desirable diameter. Controlling tangential velocity in a circulating type sensing element comprises providing a control signal to an electron exciter and/or varying strength of circulation constraining magnets.

Determining a velocity signal for a spinning disk comprises low pass filtering signals from sensing points to isolate a substantially DC velocity signal. Determining the velocity signal can comprise removing bin leakage artifacts, e.g., due to unsteady tangential velocity, and/or determining variation in velocity signal modulations due to imbalance of the rotating disk. Bin leakage removing typically is conducted in the digital domain although this is not required. Removing bin leakage is provided by resampling velocity signal to provide 2^N signal samples per rotation of spinning disk, where N is the number of sample points per rotation. Resampling is performed by resampling a velocity signal using a clock formed of low frequency components of the magnetic field signal, such as between 1 to 10 Hz, or other method providing enhanced frequency resolution.

Determining a current navigational position comprises combining the change in position determined using the sensing element with an initial position. The change in position is determined by integrating velocity over time, e.g. between initial and current times. Registering current position comprises determining position with respect to an environmental feature, e.g. a magnetic anomaly with a known position. Registering the current position may comprise updating the current position, e.g. by replacing the existing value with a value determined with respect to environmental feature. Controlling platform navigation comprises adjusting at least one of: speed, direction, track, trajectory, or attitude according to the common definitions in the art. Controlling navigation further comprises compensating for the difference between position determined by velocity integration and by other means, such as localizing or registering with respect to a known geographical location, e.g. geomagnetic anomaly. Controlling may also comprise compensating for such effects as buffeting that may cause a vehicle to depart from its desirable trajectory, e.g. as detected by device 500.

Disturbance force is quantified by subtracting a first value of velocity signal modulation, e.g. a frequency component of a velocity spectrum from a second value of such velocity signal modulation, e.g. a current value and an average or prior value, or a minimum value and a maximum value, to create a difference value, wherein first value represents wobble of the disk and the second value represents the wobble plus the effect of the disturbance force. A difference value is determined using amplitude modulation (AM) and/or frequency modulation (FM) of an encoder signal wherein encoder can detect motion of sensing element in at least one direction of; rotation, x-direction, y-direction and z-direction. Difference values for AM and FM modulations are used as a measure of relative movement between disk and sensing element due to disturbance fore. Modulations are isolated by signal processing adapted from method described in U.S. Pat. No. 5,686,669, the disclosure of which is incorporated herein by reference in its entirety, to detect blade cracks in turbines.

Variation in isolated modulations is used to determine a measure of disturbance force, which preferably is formed from time to time for the same rotational orientation of a sensing element feature, e.g. a top-dead center mark or other detectable feature, although this is not required. Difference values for AM and FM modulations are combined to form a vector quantifying the magnitude and direction of disturbance force in the plane of the sensing element. Determining disturbance force with a circulation type sensing element is conducted by directly measuring radial displacement of electron trajectory. Direct measuring is preferably conducted with two sensing points mounted proximate the cavity periphery and separated by 90 degrees although such an arrangement is not required.

Control of platform attitude and change in attitude with respect to a magnetic field is provided by processing field signals to determine direction and change in direction of a magnetic field vector. Processing can further comprise compensating for platform movement with respect to features of the magnetic field. For example, compensating for platform movement can include normalizing the detected compound velocity signals with respect to magnetic field strength. Such processing can further compensate for variations in field strength that can occur from time to time or place to place.

A method comprises controlling platform navigation by determining at least one of position and velocity, comparing determination to desirable value, and, as required, adjusting at least one of; speed, direction, and attitude of platform. Adjusting is conducted by providing a signal to an actuator of the device, other portion of platform or to a user.

Another method comprises co-processing velocity signals of any type with signals from signals from any other type of navigational instrument, e.g. IMU, gyroscope or PVT receiver, to enhance at least one of; determined position, velocity, platform control and navigation. For example, velocity signal can be co-processed with PVT signal to detect spoofing, as means of maintaining desired platform trajectory. As another example, modulation variation signals can be processed with IMU signals to provide an enhanced measure of trajectory disturbance.

A processor module comprises an analog section connected to a processing section. The analog section is any type that can be connected to one or more sensing point to receive at least one type of signal of; encoder, charge, charge separation, current, electron velocity, tangential velocity, turning rate, circulation rate, and circulation displacement, among others. The analog section type comprises signal conditioning type being composed of an amplifier such as of low noise type, connected to a frequency selective filter. In some cases, analog section comprises an analog to digital converter to provide a digital signal to processor, user or other device. In some cases, the processor module comprises a magnetometer of any type that can provide a velocity normalizing and/or field mapping signal. In some cases, the processor module further comprises or is connected to an actuator of any type that can control navigation of a platform.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for controlling navigation of a platform comprising: providing a sensing element for producing a tangential velocity of a charge during translational movement of sensing element, detecting, utilizing the sensing element, compound velocity signals induced in the sensing element from a combination of the tangential velocity and a translational velocity of the charge caused by the translational movement of the sensing element, utilizing a processor connected to the sensor, processing the detected signals to determine a velocity signal, integrating the velocity signal to determine a change in position signal, and utilizing a controller coupled to or implemented by the processor, registering the change in position to an initial position or to a detected environmental feature of known location for determining a navigation signal.

2. The method of claim 1 wherein processing the detected signals includes normalizing the detected signals using a field signal.

3. The method of claim 1 wherein the navigation signal comprises position, velocity and/or attitude type.

4. The method of claim 1 further comprising determining a signal representing the effect on navigation of a disturbing force.

5. The method of claim 1 further comprising using the navigation signal to control navigation of a platform.

6. The method of claim 1 wherein the sensing element comprises at least two sensing points and wherein the field signal is determined using at least one of a signal from one of the sensing points that is axially disposed with respect to the sensing element and a signal from one of the sensing points that is radially disposed with respect to the sensing element, a magnetometer signal, and field data stored in memory.

7. The method of claim 1 comprising low pass filtering at least one of the detected compound velocity signals and the field signal.

8. The method of claim 2 wherein the field signal comprises a resampled type.

9. The method of claim 1 comprising co-processing the navigation signal with a signal from a navigational sensor separate from the sensing element.

10. The method of claim 4 wherein determining the disturbance force signal comprises quantifying a variation in at least one of AM and FM modulation of the compound velocity signals.

11. The method of claim 5 wherein using the navigation signal to control navigation of a platform comprises providing the navigation signal or a control signal derived from the navigation signal to an actuator.

12. The method of claim 1 wherein the sensing element comprises a plurality of cavity type sensing elements.

13. The method of claim 1 wherein the sensing element comprises charged particles circulating in a high mobility material.

14. A device for controlling navigation of a platform, the device comprising:
a sensing element for producing a tangential velocity of a charge greater than 1 meter per second during translational movement of the sensing element;
a sensor comprising at least two sensing points mounted to the sensing element to detect signals induced in the sensing element from a combination of the tangential velocity and a translational velocity of the charge caused by the translational movement of the sensing element;
a processor module connected to sensor for processing signals output from the at least two sensing points and providing output signals;
a controller coupled to or implemented by the processor module to produce a navigation control signal based on at least one of the output signals; and
an actuator coupled to the controller to control navigation of a platform based on the navigation control signal.

15. The device of claim 14, wherein the sensing element comprises a spinning disk with two sensing points mounted proximate to a periphery of the disk and one sensing point mounted proximate to an axis of the disk, said sensing points being of at least one of the following types: charge, current, encoder, energy, momentum, deflection and radiation type and said sensing element being formed of slow relaxation material and having at least one detectable feature.

16. The device of claim 14 wherein the sensor comprises at least one of a magnetometer and an inertial measurement (IMU).

17. The device of claim 14 wherein the processor module comprises an analog section and a processing section.

18. The device of claim 14 wherein the sensing element comprises a charged particle circulation type.

19. The device of claim 18 wherein the sensing element comprises an evacuated cavity and/or high mobility material.

20. The device of claim 19 wherein the high mobility material comprises at least one of: graphene, indium antimonide and two dimensional charged particle gas.

21. The device of claim 14 further comprising at least one of an exciter and a deflector.

22. The device of claim 19 wherein the sensing element comprises a pair of anti-parallel arranged tube type cavities.

23. The device of claim 14 wherein controller is connected to at least one of: an output and the actuator.

* * * * *